(12) United States Patent
Geisler

(10) Patent No.: US 8,534,359 B2
(45) Date of Patent: Sep. 17, 2013

(54) LEACH RECOVERY OF OIL FROM OIL SANDS AND LIKE HOST MATERIALS

(76) Inventor: Robert Geisler, Toronto (CA)

(*) Notice: Subject to any disclaimer, the term of this patent is extended or adjusted under 35 U.S.C. 154(b) by 129 days.

(21) Appl. No.: 12/381,918

(22) Filed: Mar. 18, 2009

(65) Prior Publication Data

US 2009/0236899 A1  Sep. 24, 2009

Related U.S. Application Data

(60) Provisional application No. 61/069,953, filed on Mar. 18, 2009.

(51) Int. Cl.
*E21B 37/00* (2006.01)

(52) U.S. Cl.
USPC .......................... 166/312; 166/310; 166/305.1

(58) Field of Classification Search
USPC ................................ 166/310, 311, 312, 305.1
See application file for complete search history.

(56) References Cited

U.S. PATENT DOCUMENTS

| | | | |
|---|---|---|---|
| 3,437,146 A * | 4/1969 | Everhart et al. | 166/303 |
| 5,622,864 A * | 4/1997 | Buchanan | 435/290.1 |
| 6,274,030 B1 * | 8/2001 | Wallace et al. | 208/45 |
| 7,862,706 B2 * | 1/2011 | Dana et al. | 208/106 |
| 8,006,551 B2 * | 8/2011 | Carbonell et al. | 73/152.01 |
| 2005/0161372 A1* | 7/2005 | Colic | 208/391 |
| 2005/0197267 A1* | 9/2005 | Zaki et al. | 510/245 |
| 2006/0065396 A1* | 3/2006 | Dawson et al. | 166/279 |

* cited by examiner

*Primary Examiner* — Angela M DiTrani
*Assistant Examiner* — Cathrine Loikith
(74) *Attorney, Agent, or Firm* — Dilworth & Barrese, LLP.

(57) ABSTRACT

Oil sands and like host materials are leached with a selected leachant to render pumpable the oil (including heavy oil, bitumen or kerogen and asphaltenes) as leachate. In a preferred embodiment, natural deposits are in situ leached and the leachate recovered and removed for treatment. The leachant is separated and recycled. The leachant is selected to be biodegradable and to not precipate asphaltenes, and to comprise monoterpenes of the formula $C_{10}H_{16}$. The overall process allows environmentally acceptable resource development and contaminated site remediation.

14 Claims, 5 Drawing Sheets

Explanation
⊕ Injection well
⊖ Extraction well
○ Guard well
← Flow line

Explanation

A Limonene-type leachant
B Limonene + oil + water + clay leachate
C Periodic wash water
D Wash water + clay discharge slurry
E Clay depleted leachate
F Water included in oil
G Limonene + oil
H Bunker oil/asphaltene + limonene
I Light oil + limonene
J Light oil
K Naphtha
L Bunker oil + precipitated asphaltene
M Asphaltene
N Bunker oil + naphtha
O Bunker oil 1 Wellfield for in-situ leach oil extraction from host
2 Sand filter to remove fine clay particles
3 Membrane separation of water from limonene + oil
4 Mempore™ -type separation of bunker oil/asphaltene from limonene/oil
5 Membrane separation of light oil from limonene
6 Membrane separation of limonene plus heater/naphtha precipitation of asphaltene from bunker oil
7 Filter asphaltene from bunker oil
8 Vacuum flash separate naphtha from bunker oil

LEACH RECOVERY OF OIL FROM OIL SANDS AND LIKE HOST MATERIALS

CROSS REFERENCE TO RELATED APPLICATIONS

This application claims priority to U.S. provisional application Ser. No. 61/069,953 filed Mar. 19, 2008, which is herein incorporated in its entirety by reference.

FIELD OF THE INVENTION

This invention relates to an oil recovery process employing in situ leaching (ISL) (or mining plus passing to a leaching unit), for the recovery of oil from hosts including but not limited to oil sand, carbonate rock, sandstone and shale deposits. A selected biodegradable non-petroleum liquid has been found to be a very effective leachant for such oil-bearing host materials. The process utilizes a biodegradable plant-derived liquid leachant to dissolve or dilute the oil including bitumen or kerogen, and asphaltenes' as a closed loop zero discharge system thereby enabling more economically and environmentally-sustainable resource development that would otherwise be difficult if not impossible to achieve. The invention also is applicable to contaminated soil remediation.

BACKGROUND OF THE INVENTION AND PRIOR ART

Oil is the principal form of energy in the world. Its origin is popularly attributed to decayed organic matter formed in the Carboniferous period. In the Applicant's opinion it more probably resulted from hydrogen gas emanating from the earth's core reacting during its ascent to surface with carbon in marine limestone. Oil is mainly employed for locomotion, (automobiles, ships, aircraft,) heating, lubrication and manufacture of organic based materials. Its principal source is as natural pools chiefly in Saudi Arabia, Iran, Iraq, Nigeria, Algeria, beneath portions of the North Sea and the Gulf of Mexico and to a lesser extent in many other localities from which it is recovered by pumping. Oil also occurs in secondary deposits as heavy oil either mixed with sand (e.g. Alberta Canada, Venezuela, Trinidad and USA) or contained in carbonate rock (e.g. Canada), or sandstone (e.g. USA) or is wide-spread internationally in shales (e.g. USA).

Heavy oil has a specific gravity rating according to American Petroleum Industry (API) designation, from 0° to about 25°. It is comparatively more difficult and therefore expensive to recover heavy oil for industrial use from secondary deposits rather than from ones that can be pumped. Moreover with one notable exception, secondary deposits are not very large. The exception is the Athabaska oil deposits in the provinces of Alberta and Saskatchewan in Canada.

The Athabaska oil deposits consist of a number of oil sands deposits plus one in carbonate rocks. The main deposit, the Athabaska (after which the deposits are named), has three smaller satellites, the Peace River, Cold Lake and Lloydminster along with lesser such deposits. They form a north westerly belt across the north-central portion of Alberta extending from about 100 kms (62 miles) north of the town of Fort McMurray southward to within 75 km (47 miles) north of the city of Edmonton. The Athabaska deposit is the largest member being up to 250 km wide by 450 km long (155 miles by 280 miles). The three other principal members are about 20% of its size and the remaining members much smaller.

There are also vast amounts of heavy oil (about 26% of the amount estimated in the oil sands reserves) in carbonate rocks beneath the Alberta oil sands. These latter deposits have about 7%-40% porosity and 100 to 10,000 mDarcies (mD) permeability. These oil sands and carbonate rock deposits together are estimated to contain $2.15 \times 10^{11}$ m$^3$ of bitumen roughly equal to $1.51 \times 10^{11}$ m$^3$ of oil. This amount is equivalent to about one trillion ($1 \times 10^{12}$) US barrels (USb) of oil which is the estimate for the Saudi oil field. The Athabaska and Saudi deposits represent the two largest individual accumulations of oil in the world.

The Athabaska oil sands deposits consist of a mixture of about 1% to 15% averaging 8% bitumen (congealed oil) plus minor fine clay and water in high porosity (28%-32%) quartz arenites varying to arkosic sands of Cretaceous age. Their permeability is about 35 Darcys (D). They form flat lying sheet-like zones up to about 20 m (66 ft) thick across the deposits. The zones vary in vertical depths below surface of up to about 400 m (1,300 ft) depending on the overlying overburden thickness and are flanked above and below by sandstone-shales and limestone beds respectively. The overburden consists of muskeg, sand, gravel and clay (largely unsuitable for farming).

Bitumen is a tar like substance comprising various types of petroleum products ranging from asphaltenes to light petroleum with approximate parameters and composition, according to the API, of specific gravity=8°-14°, C=83.2%, H=10.4%, O=0.94%, N=0.36% and S=4.8%. Currently it is initially recovered from the host deposit and then either sold as is or up-graded by distillation plus reduction of S and N and addition of H to become more valuable types of petroleum products. Raw bitumen is worth about 75% of the quoted price of Saudi oil. Accordingly it is initially upgraded into two fractions: one containing about 30% of the bitumen with the heavier hydrocarbons including asphaltenes and the remainder being lighter hydrocarbons similar to Saudi crude. The fractions are refined to more valuable products.

Oil recovery from the bitumen in oil sands deposits presently entails two sequential steps that can be performed in two alternative ways:

1. The upper portion of the oil sands deposit with bitumen is recovered by open-pit mining (OPM) to a depth of about 40 m (130 ft) below surface which is the economic depth of the method. The oil sands are hauled to a concentrator and treated with hot water and caustic soda to release the bitumen which is removed by flotation. The associated sand, water and clay plus un-extracted bitumen (i.e. tailings) are discharged into a tailings pond. The objective is to perform water separation by allowing the heavy minerals (i.e. sand, clay etc.) in the mixture to settle, and the bitumen to float. This process can require many years for the separation to be achieved in the ponds.

2. Bitumen deeper than the economic reach of OPM is usually recovered by steam-assisted gravity drainage (SAGD) or an alternative steam-based technique. It entails the installation into the deposit of two sets of parallel horizontal perforated pipes, one set above the other. The pipes in each set are about 5 m (16 ft) apart. The upper set is fed with steam to heat the surrounding sands and melt the bitumen causing it to flow into the lower pipes from which it is pumped to surface.

These oil mining methods are capital intensive, and invite an environmental nightmare. In fact they have been publicly described as 'the most destructive ever designed'.

The enormous loss of water due to tailings discharge and as steam for SAGD is forecast together with expected climatic change to deplete the Athabaska River (the main source of water for the system).

Combustion of oil sands products (or natural gas) to generate steam for SAGD creates massive amounts of $CO_2$ greenhouse gas.

OPM removes as much waste volume as it does oil sands, and with tailing pond excavation, it is scarring the landscape beyond recognition.

Only about 43% of the Alberta oil sands plus underlying carbonate rock oil deposits are considered to be economically recoverable by existing technology.

The overall oil recovered from these hosts by current technology is estimated to be 50% of that in the deposit (i.e. about 40% by SAGD and 80% by OPM).

The foregoing issues, especially the Athabaska River depletion, are prompting public outcry about the sustainability of the Athabaska oil sands development. There are rising public demands to terminate oil recovery until this question is answered acceptably. Since commencement of mining in the 1960's the total petroleum output to date from the Athabaska deposits is about 0.3% of their estimated original amount of one trillion barrels of oil. Present mining rates vary from about 1,000 b/day to about 350,000 b of oil/day by 14 companies. All but three of these companies mine oil at much less than 100,000 b/day.

The combined oil mining operations in Alberta currently cover about 10% of the total area of the oil deposits. The balance is untouched mainly due to the huge mining costs involved. A mining system requires about $2 billion/100,000 b/d of oil output. None of the oil contained in the carbonate rocks is being recovered because suitable technology does not yet exist. A nuclear reactor has been proposed to generate electricity to heat the oil to cause it to flow for extraction, however the cost to build this is unlikely to be economical.

Heavy oil also exists in shale deposits with kerogen, an organic material including bitumen and other organic constituents with the formula $C_{215}H_{330}O_{12}N_5S$. Shale oil deposits contain about 3%-5% kerogen plus about 4%-20% oil. They are mined on a limited scale in the Baltic region mainly as heating fuel and to some extent as a source of oil that is recovered by leaching the crushed shale to extract the oil from the kerogen. The largest reported deposit is in Colorado, USA, and is estimated to contain $800 \times 10^9$ barrels of oil. The total amount of heavy oil in the world including that in the foregoing Athabaska and US deposits plus that in such deposits in Venezuela, Trinidad, Indonesia, Oman and elsewhere is estimated to be $6 \times 10^{12}$ barrels. The parameters, recovery methods and results for the additional deposits are essentially as described for the Athabaska deposits and the environmental impact from their mining is equally serious. Accordingly all of the said heavy oil deposits are regarded as propitious targets for the present invention.

Various processes for recovering oil from oil sands and the like by solvent extraction and in situ pooling and leaching have been studied especially in the years from about 1970 to 1985. Hot water, steam and petroleum-based solvents and diluents have been tried without real success. To Applicant's knowledge no significant commercial operation of this type has existed: it is understood that high solvent losses, low overall recoveries and other operating problems as well as competitive pressures, have kept such operations from being cost effective. Typical references include: U.S. Pat. Nos. 3,858,654; 3,881,550; 3,929,193; 4,474,238; 4,510,997 and GB Patent No. 2,136,034.

Kenchington et al. in "Energy Sources", Vol. 5, No. 4, 1981, pp. 317-338 summarizes cost parameters for solvent extraction of mined oil sands using petroleum cuts or blends of $C_6$-$C_9$ aliphatics and aromatics. Brief mention is made on p. 318 of in situ processes for oil sands too deep to mine in which a steam or flame front is generated to drive distilled and cracked product to a recovery well. No direct ISL technique is mentioned.

As used herein, the "oil" in oil sands and other host materials is intended to comprise various petroleum oils particularly heavy oil, bitumen or kerogen and asphaltenes. Normally these recovered oils are subject to various fractionations and hydrocracking to derive desired products.

SUMMARY OF THE INVENTION

Applicant has found that selected plant-derived biodegradable non-aqueous liquids are unexpectedly advantageous solvents for oil extraction including in situ leach mining of oil-bearing deposits. In particular monoterpenes having the formula $C_{10}H_{16}$ have been found very suitable for e.g. in situ leaching of deposits having heavy oils/bitumen/asphaltenes therein. These monoterpenes are a renewable resource and are by-products for example of citrus fruit processing and wood harvesting and are biodegradable.

The use of a biodegradable non-toxic, non-carcinogenic, plant-derived leachant of this type leads to degradation of residual amounts of leachant left following its application and enables environmentally-sustainable resource development. Especially in the case of remediation of contaminated sites, the residual monoterpene leachant after in situ leaching is believed to enhance the overall biodegradation of leachant-plus-oil remaining at the site, and expedite remediation. This is not feasible with non-renewable petroleum-based solvents. Preferably the selected leachant has a biodegradability significantly exceeding that of toluene.

Selected monoterpenes include:

|  | Boiling Point (range) | Flash Point |
| --- | --- | --- |
| Limonene (d or l) | 176-177° C. |  |
| Dipentene (d + l) | 175-176° C. | 45° C. |
| β-Pinene | 164-169° C. | 47° C. |
| α-,β-Terpinene | 180-183° C. |  |

Preferred monoterpenes include d-limonene, l-limonene and dipentene.

Alpha-pinene has b.p. 156-160° C. and flash point of 32° C. and would require appropriate handling precautions: it would be more suitable for use in winter conditions.

It has been found that these monoterpenes are able to provide leachates of pumpable viscosities when present in amounts as low as about 20% by volume of the leachate. They are able also to allow and withstand repeated separation and recycling steps.

Surprisingly it has been found that the porosity and permeability of the Athabaska oil sands deposits and their underlying oil bearing carbonate rocks plus the oil bearing sandstones in the USA, as shown in the following table, renders them excellent candidates for ISL according to this invention. In addition the necessary permeability to enable ISL may be created in formations such as shale deposits by hydrofracturing them with the addition of particles such as aluminum oxide acting as propants to hold fissures open and thus allow access to the oil deposits, as known to those skilled in the art.

| Oil Deposit | Porosity | Permeability |
|---|---|---|
| Athabaska oil sands | About 35% | About 35 D |
| Athabaska carbonate rocks | About 20% | 100-$10^4$ mD |
| USA sandstones | About 16%-22% | 100 mD-600 mD |

For the in situ leach to occur, deposit permeability preferably is at least about 100 mD.

The process of the invention incorporates a leachant extraction step performed on the oil-containing host that selectively dissolves the oil and/or bitumen or kerogen in whichever form the oil may exist plus entrains any associated water. After leachate recovery the water is removed (e.g. by membrane) and may be recycled with leachant or reinjected into the earth. In one aspect, the remaining leachate is separated (for example by a distillation or membrane process) into a heavy and light oil fraction. Limonene is membrane separated from the bunker oil. Asphaltene is precipitated from the bunker oil with naphtha and recovered by filtration. Naphtha is vacuum flash separated from the final bunker oil which is then passed to an up-grader. The light oil fraction is treated to remove the leachant for recycling and the resulting oil is processed for market. In another aspect, the leachant is separated initially from water-free leachate e.g. by vacuum distillation or by a membrane that removes the associated oil component and enables the resulting leachant to be recycled for further leaching.

The process also has the potential of recovering oil resources from low grade or small deposits in contrast to other processes that would not be economical. It is versatile and capable of high recovery and output well beyond that by conventional technologies currently in use to recover oil and/or bitumen from the foregoing deposit types. Moreover it does so in a more advantageous manner. It can achieve oil recovery at comparatively lower costs with reduced environmental impact because it does not employ steam, can avoid mining operations that create substantial ground disturbance or waste piles and avoids contaminated or toxic discharges.

One example of ISL entails installing a series of vertical pipes according to a selected certain pattern, into a geological formation of suitable porosity and permeability to permit a leachant to be pumped through the formation via some of the pipes to dissolve target constituents. The resulting leachate is recovered to surface for treatment via the remaining pipes.

This technique employing selected monoterpenes would aim to recover oil/bitumen almost completely from host deposits at comparatively low cost and virtually no environmental impact. Excess groundwater dilution of the oil/bitumen can be reduced by appropriate wellfield design employing guard wells. Extracted groundwater may be treated to meet statutory regulations and reinjected into the earth at a suitable site or otherwise disposed of.

The permeability of a deposit can be increased if necessary to perform ISL by means well known to those skilled in the art. A standard method is to adopt the procedure employed by water well drillers to hydrofracture the deposit by injecting high pressure water at up to 20,000 psi or more to separate portions of the deposit and adding a propant such as fine particles of aluminum oxide to keep the separated portions apart. The limonene or other monoterpene leachant can be recovered from the oil/bitumen leachate e.g. by membrane separation or by vacuum distillation. It is recycled for further leaching and the oil/bitumen/asphaltene components recovered for sale or refining to more valuable products.

Because the process does not utilize added water or steam to recover oil from Alberta oil sands, it will help prevent depletion and pollution of the Athabaska River (or other water sources). Most importantly, it will make an immense contribution to greenhouse gas reduction by eliminating the $CO_2$ generated by burning natural gas to create the steam. The sale of carbon emission credits from this step could be substantial. Use of the process to replace steam-based oil recovery could also prevent the need for the multi-billion dollar pipeline proposed to collect and impound the $CO_2$ currently resulting from Athabaska oil recovery.

This in situ aspect of the process could also be used to recover much of the $2.18 \times 10^9$ barrels of by-passed oil remaining in mature domestic U.S. oil fields, as reported by the U.S. National Energy Technology Laboratory, or from similar fields elsewhere in the world. The process could also be used to recover the oil from the oil shale deposit in Colorado USA, or from other shale deposits.

The present invention would prevent all of the foregoing problems inherent in the current practice of recovering oil/bitumen from the stated deposits i.e.:

huge equipment investment for OPM and SAGD immense loss of water to create steam and via flotation tailings creation of $CO_2$ by generation of steam for SAGD substantial oil loss by OPM or SAGD, due to low recoveries impracticality of OPM and/or SAGD for small deposits massive ground disturbance.

A particular benefit of the process would be to approximately double the monetary value of the oil sands deposits for which it is used. This is because it can recover over 95% of the contained oil compared to about 50% by current technology. It also should be able to advantageously recover the oil contained in the sandstone and carbonate rocks that is considered to be uneconomic by existing technology. Test results e.g. of Examples 1 and 2 also disclose the ability of selected monoterpenes e.g. d-limonene to leach oil from a shale deposit.

In broad terms the invention includes a process for recovering oil from oil sands and like host materials, comprising (a) leaching the host materials with a leachant selected to (i) liquify the oil phase without precipitating asphaltenes, (ii) be biodegradable, and (iii) be recyclable; (b) recovering the liquified oil phase; as leachate and (c) separating the leachant for recycle.

Preferably the invention is directed to a process of separating oil from oil sands and similar oil- and mineral-containing host materials, comprising (a) contacting the host materials with selected leachant comprising at least one terpene having the formula $C_{10}H_{16}$; (b) removing the oil-loaded leachate from the mineral solids; (c) separating the leachant from the loaded leachate and recycling the leachant to step (a); and (d) recovering the separated oil for further treatment.

In one embodiment the oil sands or similar host materials are in their original deposit location and are subject to in situ leach mining using the selected leachant and the loaded leachate removed and passed to a processing site.

In some cases the host materials are open-pit mined and transported to a processing site for steps (a) to (d).

It is also intended that the host material may be oil-contaminated soil (including sub-soil) that is treated in situ or off-site for the purpose of remediation.

Monoterpene leachants preferably are selected to comprise at least one of limonene (d or l), dipentene, β-pinene and α- and β-terpinene.

The invention includes leachate compositions comprising selected monoterpene leachant and oil leached from oil- and mineral-containing host materials.

DETAILED DESCRIPTION AND PREFERRED EMBODIMENTS

Figure 1:
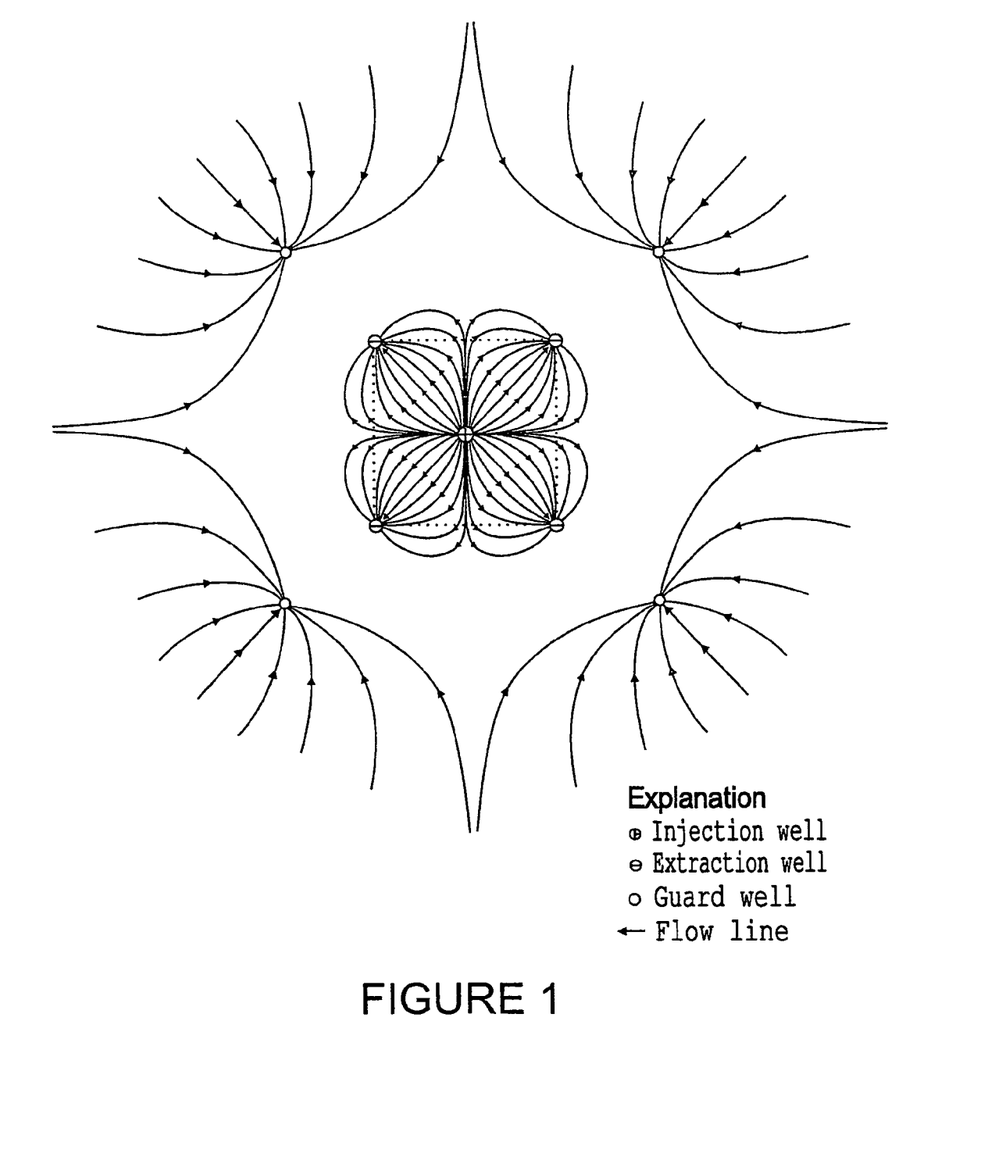
FIG. 1 depicts the conceptual streamline flow leaching pattern of a regular five spot well system with corner guard wells. It illustrates one general technique of the method that would be employed to perform ISL if groundwater surrounding the oil sands deposit seriously impacts oil recovery by ISL.

ISL performed on sand, carbonate rock, sandstone or shale oil deposits to recover oil entails injecting leachant through the deposit to dissolve the oil into a leachate that is then recovered and treated to separate the oil, from the leachant and recycle it for further leaching. FIG. 1 illustrates the basic principle of ISL. It depicts the computer generated stream lines of a solution flowing from an injection to recovery points in a permeable medium. The leachant is injected into the deposit via pipes inserted in the deposit according to a wellfield design based on hydrologic modeling studies and ISL tests conducted on the deposit. The leachate is treated to recover the oil for sale, remove the leachant for re-use and re-use or discard associated water.

The well system shown in FIG. 1 is referred to as a five spot system. It consists of five vertical wells installed in a square pattern in a geologic formation of suitable porosity and permeability. One of the wells is located in the center of the pattern to inject solution (leachant) to dilute target oils thereby forming a leachate. A vertical well is also located at each corner of the pattern to conduct pumping forming sinks to recover the leachate. The leachate is discharged to the plant for treatment.

Guard wells may surround the well system as needed according to modeling studies. Their purpose is to recover groundwater to reduce its ability to dilute recovered leachate. The water they collect is discharged at a suitable distant site.

The stream flow lines depict the paths of individual segments of the leachant moving toward a recovery well. The segments outside of the well system boundary will leach the relevant area traversed and attract groundwater. Potential minor leachate excursion in the course of ISL recovery (i.e. wandering beyond the well system) is regarded as unimportant because of its organic plant-derived similarity to and therefore compatibility with its environment particularly due to the biodegradable leachant selected.

An inverted well system involves injection performed by the four peripheral wells and recovery by the central well. Its choice as well as that of either a regular or inverted polygonal well system (providing more recovery wells to offer dilution abatement and leaching advantages) is indicated by modeling.

The first steps of the ISL process are to define the geologic and hydrologic parameters of the oil deposit in order to perform modeling studies. Parameters include (a) extent/variation in bitumen concentration and contained oil and (b) porosity, permeability, solution travel time between injection and recovery wells, groundwater amount and flow direction and size/distribution of fractures that could affect leaching. This information enables the design of a wellfield to yield the desired rate of oil recovery.

It may be necessary to increase the permeability of a deposit to enable satisfactory ISL or to strengthen the walls of the installed wells to prevent caving or to plug channels in the deposit or surrounding formation that act as short circuits preventing proper leachant delivery. These tasks can be performed by people skilled in the art. The first can be achieved by hydro-fracturing the deposit (i.e. injecting high pressure water with the addition of aluminum oxide particles to force and prop open fractures necessary for the purpose). Strengthening well hole walls is accomplished by electrical induration. Preventing potential short circuit channels entails mapping their routes by water injection temperature sensing and then plugging them at selected locations by injecting cement grout.

Injection and recovery wells are purpose drilled vertical holes about 15 cm (6 in) OD according to the selected wellfield pattern. They extend from ground surface to the bottom of the portion of the deposit selected for ISL. They are cased from surface into the top of the deposit to strengthen the well mouth.

Figure 2:
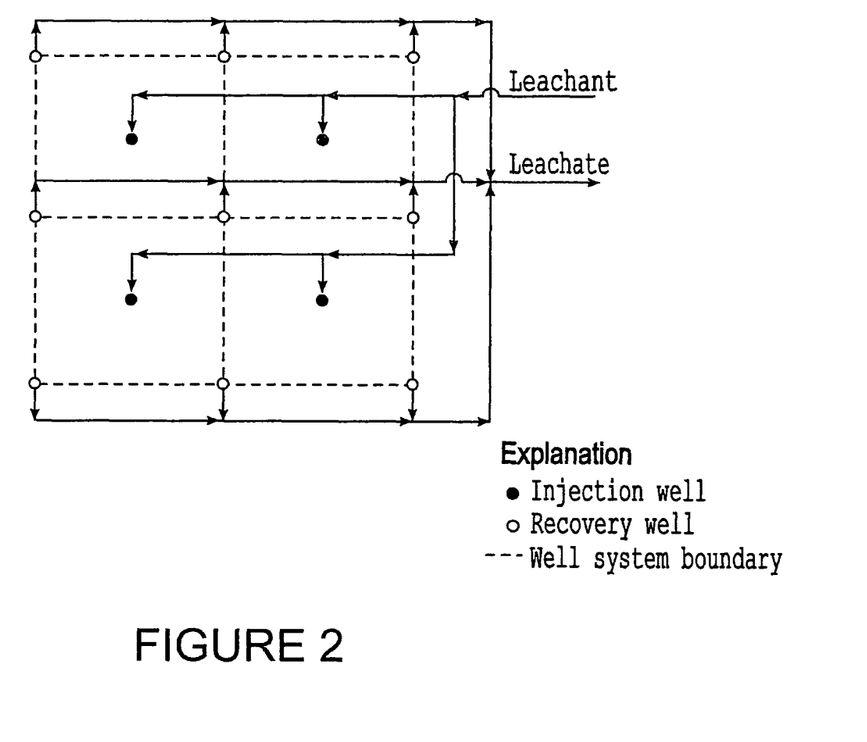
FIG. 2 depicts a wellfield consisting of four adjoining regular five spot well systems. It illustrates the general layout of a wellfield to perform ISL. The size of the well systems and therefore the resulting wellfield and the resulting oil production, are based on the relevant hydrologic parameters understood by those skilled in the art. Example 5 illustrates the association between wellfield size, and oil production.

For example, in FIG. 2, leachant is supplied to the wellfield from the treatment plant via a single pipe e.g. consisting of high density PVC, lying on ground surface and usually extending to a pump house. From there leachant is distributed by individual pipes (e.g. PVC) to the respective injection well heads where a high pressure pump injects it into the host material. Sensors installed in the individual pipes record relevant parameters including speed, volume and chemistry. This information is relayed to the control centre in the plant to guide changes in the leachant delivery protocol and to forecast estimated oil production. Continuous solution movement in pipelines prevents freezing. In the event of plant delays e.g. in winter, solutions can be recycled through the deposit until operations resume. Recovery well pumps usually send their leachate to the pump house where it is combined into a single pipe to the plant.

The main concerns of ISL are to insure efficient delivery of leachant through the deposit to provide sweep efficiency and to prevent leachate escape (i.e. excursion that would contaminate the surrounding region). In the circumstances the latter is not a serious issue because of the extensive expanse of oil host surrounding the area being leach mined identical in nature to the leachate components plus the absence of toxic chemicals being used as leachant.

Figure 3:
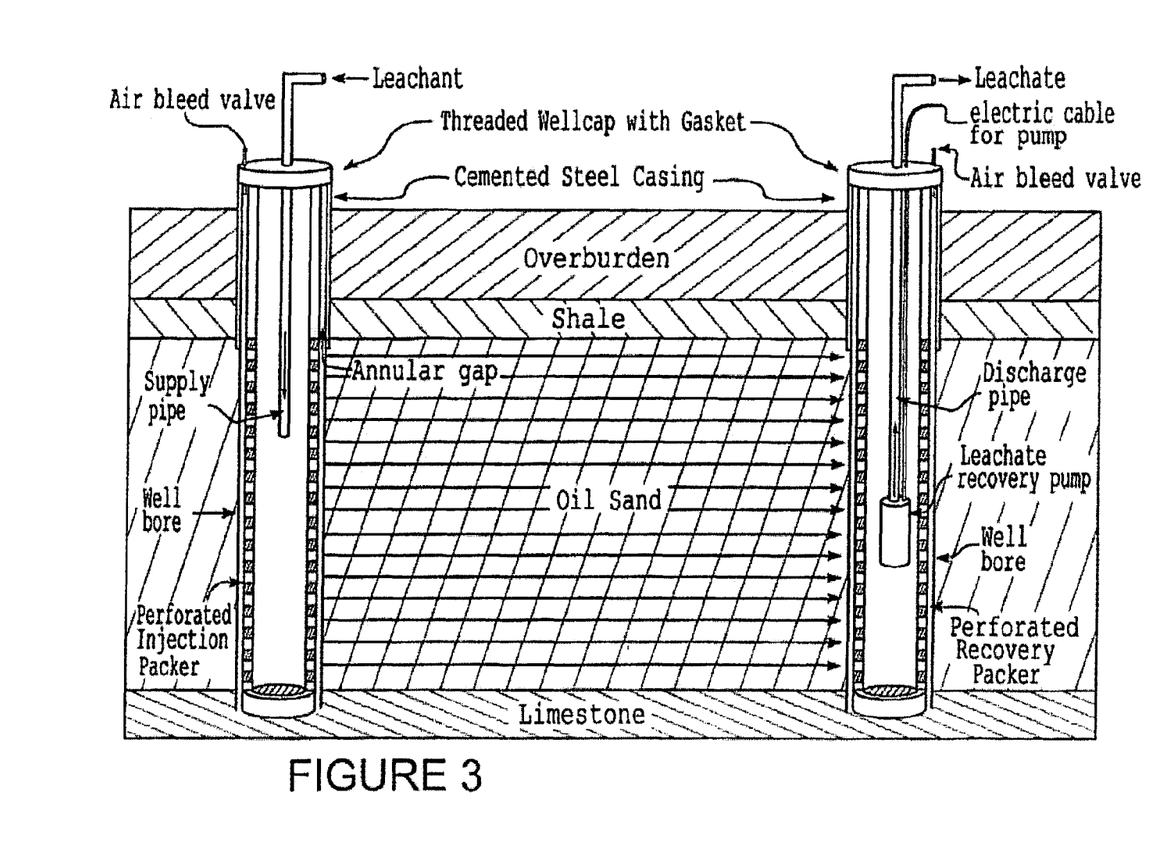
FIG. 3 depicts a conceptual injection and recovery straddle packer system for use in wells. In one embodiment straddle packers are the heart of each well system enabling leachant solution delivery to and leachate recovery from specific parts of the area to be leached.

In one aspect each well is fitted with a straddle packer system e.g. as depicted and described in FIG. 3 consisting of a pipe e.g. stainless steel, extending from surface to the bottom of the wellbore. It is perforated along its portion traversing the target extraction vertical section to enable injection or recovery of leach solutions. The pipe is sized for the injection pressure and amount of solution to be delivered. At least each injection packer includes means to prevent upward migration of solutions (e.g. via the annular gap shown in FIG. 3). Packer systems intended to recover rather than inject solutions are fitted with internal submersible pumps rather than external injection pumps.

Well holes are drilled to a depth slightly beyond that of the oil matrix section to undergo leaching and to accommodate the packer system e.g. as in FIG. 3. A metal casing with pressure-resistant cap is inserted into the top of the well hole to a depth slightly deeper than the top of the oil sands deposit to stabilize the well entrance and prevent upward migration of leachant along the wellbore.

A packer system is installed in the well to confine injected leachant to a particular section of the deposit to be leached. The packer preferably consists of a sectional pipe e.g. 316 stainless steel, extending from the top to bottom of the wellbore. The central service portion covers the section of the well intended for leaching. Its outside diameter (OD) is slightly less then the inside diameter (ID) of the wellbore and is perforated to enable injection or recovery of solutions. Its upper end is sealed e.g. by a suitable gasket covered by a threaded or otherwise secured cap attached to the upper end of the casing. This prevents vertical migration of fluids in the annular gap next to the casing thereby sequestering (i.e. packing off) the section to be leached. Air in the annular gap may be bled off through the air bleed valve shown. Alternatively two expandable straddle packer gasket systems may be installed in the well hole at the top and bottom of the section to be leached to help limit leachant movement vertically.

A shorter narrower supply pipe is attached to the upper end of the injection packer to convey leachant to the packer service pipe section (FIG. 3).

The recovery packer is fitted with a submersible electric pump. The pump exit is attached to the bottom of the discharge pipe to discharge leachate through it to surface where it is conveyed to the plant. The injection and recovery packers are readily inter-convertible.

As examples for ISL there are two standard ISL well system arrays described herein with differing attributes designed to inject and recover solutions. A regular five spot well system consists of a square pattern with a vertical well at the centre of the square to inject leachant to dissolve intervening material plus a vertical well at each corner of the pattern to recover resulting leachate. An inverted five spot well system injects leachant at the corner wells and recovers leachate from the central well. A series of adjoining well systems constitutes a wellfield. The addition of guard wells with recovery pumps appropriately placed around a well system or wellfield perimeter discharging such water at a suitable distant site can greatly assist in reducing groundwater dilution of recovered leachate. The optimum design of a well system as to shape (square or polygonal), regular or inverted and guardwell locations, to maximize sweep efficiency is based on ISL field tests and modeling studies.

In practice, a wellfield necessary to recover the target amount of oil is installed in the oil-bearing deposit according to a pattern based on modeling studies and hydrologic tests. Leach solution (leachant) is injected through the deposit via some of the wells to selectively dissolve the calculated amount of oil. Resulting pregnant solution (oil/monoterpene leachate) is extracted through adjacent wells and pumped to the treatment plant where the leachant, the dissolved oil and associated water are recovered selectively.

FIG. 1 reveals that the outer segments of an injection plume travel farther than the central direct one to reach the recovery well. The extra length of the outer segment is initially made up of groundwater dilution. However such dilution is quickly replaced by target leachate thereby eliminating its effect. In the case of an oil sands deposit where groundwater appears to be minimal (at least in the upper regions of a deposit) removal of associated water is consequently less serious than it would be for an inorganic target mineral.

One option of an ISL wellfield to recover oil from a deposit is conceptually depicted in FIG. 2. It comprises four adjoining regular five spot well systems with central wells injecting leachant plus peripheral pumping wells that recover the leachate. A treatment system selectively recovers the resulting monoterpene-oil leachate by rejecting its associated groundwater.

Figure 4:
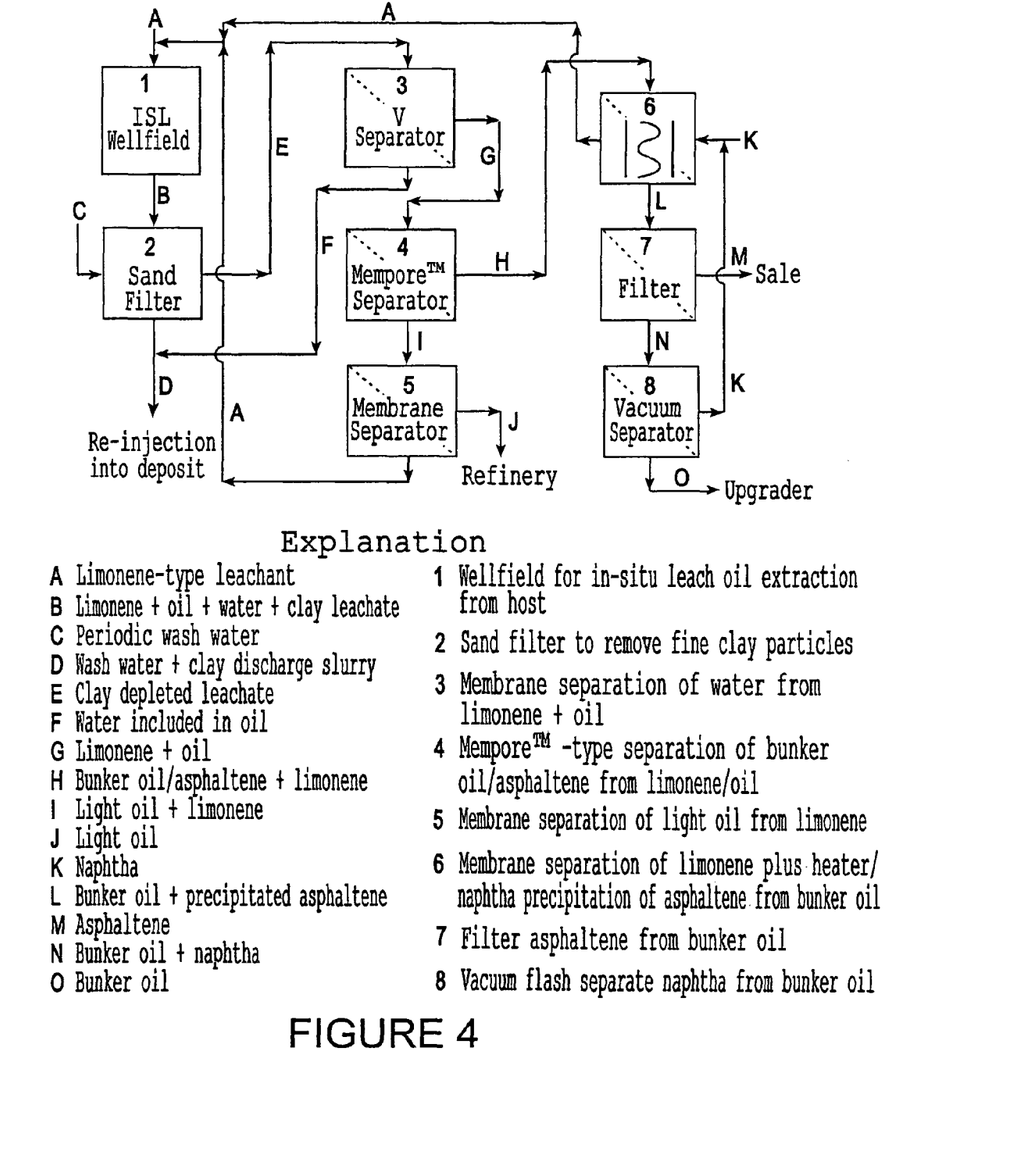
FIG. 4 is a conceptual block diagram depiction of a process flowsheet to recover oil contained in oil sands, carbonate rock (limestone), sandstone or shale oil deposits.

Referring to FIG. 4, it should be noted that all of the liquids described especially the oil have been observed to be susceptible to radio frequency (RF) heating. Accordingly steps 3, 4, 5 6 and 8 could alternatively be performed by vacuum distillation utilizing RF heating of the liquids to replace use of natural gas thereby preventing $CO_2$ creation. Monoterpene leachant (A) diluted if desired with water to control leachate viscosity, is injected via wellfield (1) through the host deposit to dissolve its oil to form an oil-monoterpene-water sediment leachate (B). This solution is recovered from the deposit and fed to a sand filter (2) to remove fine particulate entrainment (e.g. kaolin and illite that could affect subsequent oil refining). Two sand filters with pressure sensors are employed, one at a time. When the sensor indicates a filter is plugged with particles the filter is replaced and back-washed with water (D) that is discharged. The clay etc depleted leachate is treated in (3) by e.g. Vsep™-type membrane to extract about 2% water included with the oil that is sent to stream (D). The remaining oil in limonene fraction (G) in unit (3) is transferred to step (4) where it is separated by a self assembly membrane (e.g. a Mempore™-type) into a heavy (bunker oil+asphaltene) fraction and a light (oil+limonene) fraction. These membrane types able to separate a) water from such hydrocarbon mixtures and to separate b) different molecular size fractions from such mixtures, are known in the art.

The light oil+limonene from (4) is transferred to (5) where its components are separated (e.g. by membrane or vacuum distillation). The limonene (A) is recycled to leachant; the light oil J is sold to a refinery. The heavy oil fraction (H) from (4) containing bunker oil plus asphaltene is treated in (6) by heating e.g. RF heating (to decrease viscosity) plus naphtha K (or pentane) addition to precipitate the asphaltene component which is separated at 7. The asphaltene M is sold to industry and the bunker oil (O separated at 8) sold to an upgrader.

Figure 5:
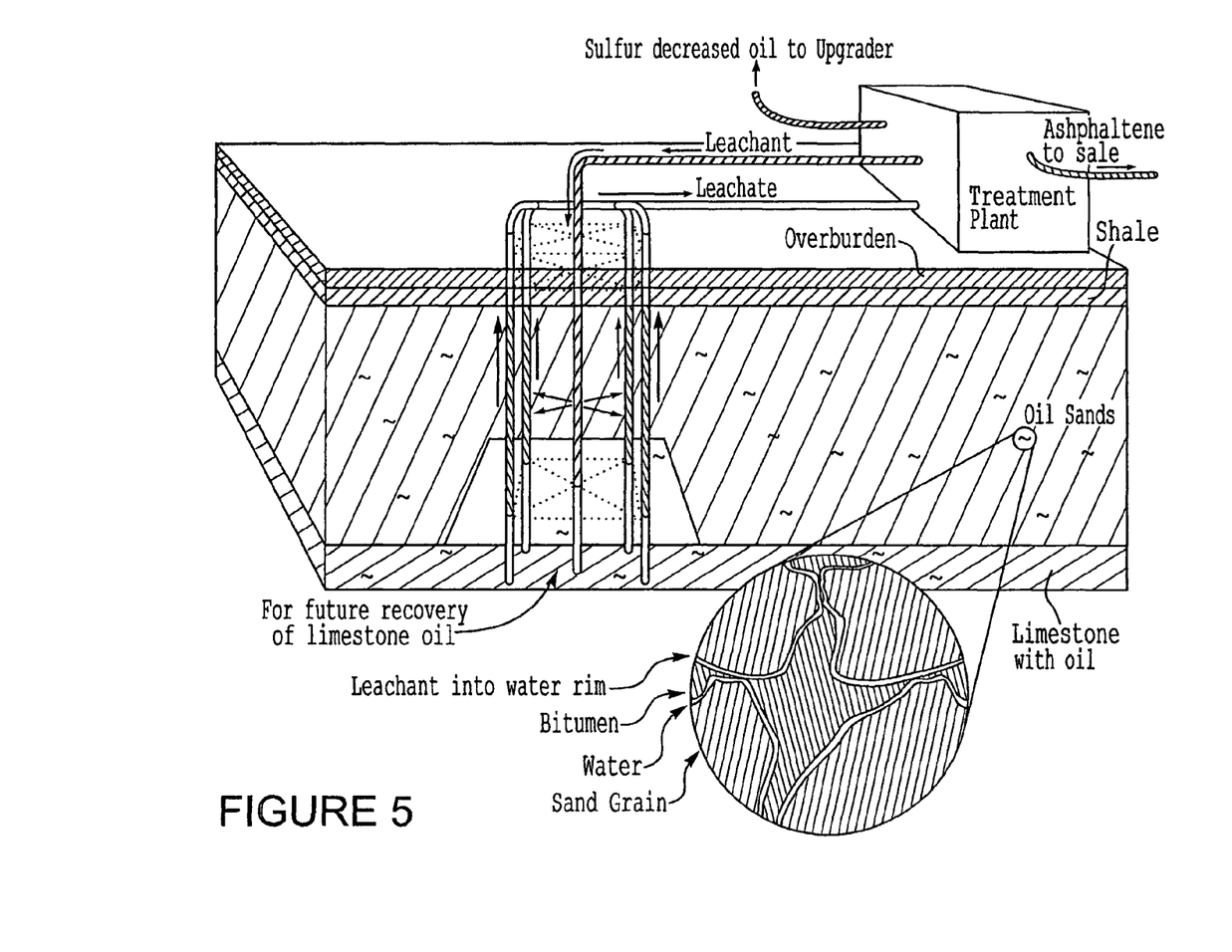
FIG. 5 depicts in cross-section a conceptual ISL system to recover oil from an oil sands and/or underlying carbonate rock with oil deposit.

Referring to FIG. 5, because of the differing oil deposits in the illustration (i.e. oil sand and oil in carbonate rocks), the straddle packer that would be employed must be adjusted to suit the material being leached. If the deposits have different permeabilities they cannot be leached together because the one with higher permeability will short circuit leachant intended for the other. Consequently the lower permeability zone must be hydrofractured to equal the adjoining permeability or both deposits leached separately.

Referring to FIG. 5 showing the sand grains, microscopic examination has revealed that such grains (plus their associated bitumen patches) are surrounded by a thin layer of water that evidently enables leachant (with which water is present) to migrate along the hydrophilic surfaces of sand to reach bitumen which facilitates the leachate phase-particle separation in situ and also in subsequent processing. (Microscopic Structure Of Athabaska Oil Sands, Koichi Takemura, Canadian Journal of Chemical Engineering, vol. 60, August 1982).

EXAMPLES

The following examples are meant to illustrate but not limit the invention.

Example 1

Bitumens and particularly the asphaltenes therein are the components of the oil in oil sands and the like, which are most difficult to dissolve and maintain in solution. Naphtha and toluene are known to be very good solvents for bitumens including asphaltenes but subsequently precipitate the asphaltene. In comparison tests, limonene was found to be a good solvent for bitumens and shale oils (approaching toluene in effectiveness) and able to prevent asphaltenes from precipitating. Naphtha was found to precipitate asphaltenes from heavy oil during pipeline transportation thereby causing blockage preventing its transportation.

Monoterpenes such as limonene and dipentene are much less toxic than mineral spirits (and toluene), are non-caustic, non-reactive to metal surfaces, non-carcinogenic or mutagenic and are readily biodegradable. Due to their flash points these selected monoterpenes should be handled with appropriate care. They are currently regulated as volatile organic compounds (VOC), however their use with recycling should not result in the release into the environment of any more materials than would occur naturally.

D-limonene is listed as a non-toxic chemical in the toxic substances control act (TSCA). It is not a Species At Risk Act (SARA) Title III compound and is not regulated by the Clean Air Act. The product is also classified as a food additive and has been granted the FDA's GRAS (Generally Recognized As Safe) status. The Environmental Protection Agency (EPA) regulates the use of d-limonene when insecticidal properties are claimed. It coagulates if exposed to sunlight but this can be prevented by the addition of a small amount of an antioxidant e.g. butylated-hydroxy-toluene (BHT) which is also used for human consumption. Other antioxidants such as phenyl-beta-naphthamine and di-tert-butyl-para-cresol may be used. D-limonene is manufactured inter alia by Florida Chemical Company Inc, 351 Winter Haven Blvd, Winter Haven Fla. 33881-9432, USA, tel. 863.284.8493. It is available through major distributors e.g. EWR International Inc, 1310 Goshen Parkway, West Chester Pa., 19380, USA, tel 619.431.1700. It is understood to be available also from producers in Brazil and Asia inter alia.

Dipentene is available, similarly and compared to d-limonene, is more resistant to oxidation.

Example 2

D-Limonene Dissolution of Bitumen

Laboratory tests disclosed that the ratio of d-limonene to bitumen for the leachate to provide highest flow rate was about 54 gm bitumen/1 liter of d-limonene. One liter of limonene is able to render pumpable up to about 40 g oil from oil sands.

Example 3

Recovery of Oil from Oil Sands by Means of d-Limonene

One kg of oil sands containing about 10% bitumen was mixed with a slight excess of d-limonene according to the formula described in Example 2 in order to dissolve the contained bitumen into oil. A quantity of water was added to the mixture to convert it to a free-flowing slurry. The slurry was pumped through a static mixer and then treated in a lamella separator. The separator over-flow solution consisting of mixed d-limonene, oil (resulting from dissolution of the bitumen by d-limonene) and water was fed to a VSep™ membrane separator. The resulting products consisted of (a) oil plus d-limonene and (b) clean water. The separator underflow was filtered and the cake was washed with water yielding a clean sand product without bitumen. The cake wash was returned to the water supply.

The d-limonene could be recovered from (a) either by flashing (vacuum distillation) or by membrane separation leaving a clean oil product for refinery upgrading. The water from (b) (less any excess amount picked up in practice from the bitumen that would be discarded by re-injection) is recycled. The final cake would in practice be used as mining back-fill. Accordingly the system forms a simple closed loop circuit employing no water that is able to recover 90%+ of oil sands bitumen.

It is worth noting that the system could be advantageously utilized to remove organic contamination from soil e.g. the Sydney NS tar ponds.

Example 4

D-Limonene-Bitumen Leachate/Water Separation

A test of a 1 mL emulsion of 50:50 by volume d-limonene-bitumen leachate in water disclosed that the two components rapidly separated into individual phases with a sharp meniscus between them indicating that a gravity technique can be relied on to achieve good leachate/water separation. The emulsion is more pumpable than the leachate per se.

Example 5

Estimated Oil Recovery from Hypothetical Block of Oil Sands

The greatest thickness of various oil sands layers in Alberta is reported to be about 20 m (i.e. about 66 ft). Assuming the permeability of such oil sand of about 35 Darcies a wellfield area 600 ft square over half that depth of oil sand would represent an oil sands block amounting to 600×600×33 ft=12×10$^6$ ft$^3$. That is easily within the capability of ISL in one day given the permeability of the target material. It is calculated that this ISL of this block would be achieved at a leachant injection rate of 1,000 Usgal/min. in about one day.

Assuming average bitumen content=8% therefore the contained bitumen in the zone=10×10$^5$ ft$^3$. At 5.62 ft$^3$ bitumen/USb therefore this represents 1.78×10$^5$ USb/d of bitumen. Assuming 70% bitumen=oil (balance is asphaltene) the foregoing=1.246×10$^5$ USb/d of oil=455×10$^5$ USb/yr of oil and @ \$40/b=\$1.8×10$^9$/yr. Increasing the depth of the ISL system to the bottom of the deposit (i.e. 66 ft) could be accomplished and would essentially double the income to about \$3.6×10$^9$/yr.

The foregoing ISL estimation indicates the potential value of oil recovery from oil sands/carbonate oil bearing rock or oil shales that can be achieved.

Oil from the foregoing sources is regarded as heavy oil. Apart from oil sands its normal rate of production by North American producers is less then about 100,000 USb/d. Two of the current fourteen Athabaska oil sands operators produce about 200,000 USb/d and are scheduled to increase output to about 350,000 USb/d. As these calculations indicate, an ISL project involving a wellfield 183 m2 (600 ft2)×10 m (33 ft) deep could produce about 125,000 USb/d of oil based on conservative figures. Expanding this output could be possible, by appropriate extended use of the present invention.

Example 6

One preferred ISL process is to carry out in situ leaching utilizing d-limonene as a solvent (leachant) appropriately diluted with water Oust sufficient to enable dissolution and pumping of leachate and separation of solids) and employing a wellfield consisting of adjoining regular or inverted five spot well systems with guard wells linked together to recover oil/bitumen from either an oil sands, carbonate rock, sandstone or shale deposit to dissolve oil phase from such deposit to form a d-limonene-oil/bitumen-water leachate. The leachate is pumped to a treatment plant to remove associated water e.g. by a membrane-type separator and the water-depleted leachate is separated by means of a nanofilter with self-assembly pores into two fractions. One fraction contains light oil with oil components containing about four to sixteen or more carbons; the other contains heavy oil with oil components containing about thirty-six to eighty carbons. The light oil fraction is treated by membrane or vacuum distillation to remove leachant that is recycled to the wellfield for further in situ leaching and the resulting light oil is recovered. The heavy oil fraction is passed to an up-grader that removes remaining leachant component and returns it for further in situ leaching and the heavy oil recovered.

Example 7

Unrecovered Oil Sands Oil Following d-Limonene Leach

About 85 gms of leached oil sands was re-leached by the Dean Stark method entailing a hot toluene leach. The sands had been repeatedly leached by d-limonene until there was no apparent discolouration to the leachate suggesting no further bitumen was available in the sand for extraction. The leached sand was light tan in colour, completely dry to the touch and odorless. The amount of oil recovered by the leach amounted to 1.4%. Thus the limonene-type leaching is able to recover up to about 95% of the oil. When leaching host material, leachant can be supplied to, and leachate recovered from the material (repeatedly or continuously) until sensing of the oil (or oil component) level in the leachate indicates the desired oil recovery has been achieved.

What is claimed is:

1. A process of separating oil from oil- and mineral-containing host materials, comprising:
   (a) contacting the host materials with at least one terpene having the formula $C_{10}H_{16}$ as leachant, sufficiently to leach the oil present into the terpene phase and form terpene-plus-oil leachate;
   (b) removing the leachate from the host materials;
   (c) separating the terpene leachant from the leachate and recycling the leachant to step (a); and
   (d) recovering the separated oil for further treatment,
   wherein the host materials are selected from:
      (i) deposits in their original deposit location and are subject to in situ leach mining using the selected leachant and the leachate removed and passed to a processing site;
      (ii) materials which are open-pit-mined and transported to a processing site for steps (a) to (d); and
      (iii) materials which comprise oil-contaminated soil for remediation.

2. The process of claim 1 wherein the host deposits are oil sands in their original deposit location and are subject to in situ leach mining using the selected leachant and the leachate removed and passed to a processing site.

3. The process of claim 1 wherein the host materials are open-pit-mined and transported to a processing site for steps (a) to (d).

4. The process of claim 1 wherein the host material comprises oil-contaminated soil for remediation.

5. The process of claim 1 for separating non-pumpable oil from oil- and mineral-containing permeable host deposits, comprising:
   (e) in situ leach mining to contact the permeable host deposit with the selected terpene leachant and thereby leach a high proportion of the oil present into the terpene phase;
   (f) removing the leachate from the deposit and passing to a processing site;
   (g) separating the leachant from the said leachate and recycling the leachant to step (e); and
   (h) recovering the separated oil for further treatment.

6. The process of claim 5 wherein the deposit has a non-uniform permeability and the lower permeability zones therein are pretreated to increase their permeability and provide a more uniform permeability for step (e).

7. The process of claim 5 wherein water is present after step (e) and in step (f) as a separate phase in the leachate, either as groundwater or groundwater-plus-added-water, in amounts selected to provide a desired overall pumpability for step (f) and the water is separated from the leachate after step (f).

8. The process of claim 5 wherein the oil comprises light oil, heavy oil, bitumen or kerogen, and asphaltenes, which are separated after step (h), or as part of step (g).

9. The process of claim 5 wherein the host deposit is selected from those having, or being pretreated to have, a permeability of at least about 100 mDarcies.

10. The process of claim 5 wherein step (g) comprises separating the leachate into light and heavy fractions followed by at least one of vacuum distillation and membrane separation on each fraction.

11. The process of claim 10 wherein the heavy fraction comprises asphaltenes which are precipitated by addition of naphtha or pentane.

12. The process of claim 1 wherein the terpene comprises at least one monoterpene hydrocarbon selected from the group consisting of limonene, dipentene, β-pinene, and α- and β-terpinene.

13. The process of claim 12 wherein the terpene comprises at least one of limonene and dipentene.

14. The process of claim 1 wherein the host deposit comprises at least one of sand, sandstone, carbonate rock and shale.

* * * * *